(12) United States Patent
Sugi et al.

(10) Patent No.: US 7,469,601 B2
(45) Date of Patent: Dec. 30, 2008

(54) FLOW METER USING DIGITAL SIGNALS

(75) Inventors: Tokio Sugi, Tokyo (JP); Tomoyuki Okumura, Tokyo (JP)

(73) Assignees: Tokyo Keiso Co. Ltd. Shiba Toho Bldg., Tokyo (JP); Tokyo Magnet Engineering Co. Ltd, Tokyo (JP)

( * ) Notice: Subject to any disclaimer, the term of this patent is extended or adjusted under 35 U.S.C. 154(b) by 0 days.

(21) Appl. No.: 11/679,993

(22) Filed: Feb. 28, 2007

(65) Prior Publication Data

US 2007/0227265 A1    Oct. 4, 2007

(30) Foreign Application Priority Data

Apr. 3, 2006    (JP)    ............................. 2006-102137
Oct. 3, 2006    (JP)    ............................. 2006-271495

(51) Int. Cl.
*G01F 1/24* (2006.01)
(52) U.S. Cl. .................................................. 73/861.56
(58) Field of Classification Search .............. 73/861.56, 73/861.57, 861.55
See application file for complete search history.

(56) References Cited

U.S. PATENT DOCUMENTS

| 4,335,618 | A | * | 6/1982 | Bucsky et al. | ............. 73/861.56 |
| 5,974,721 | A | * | 11/1999 | Johnson et al. | ............... 43/17.6 |
| 6,293,143 | B1 | * | 9/2001 | Denton et al. | .................. 73/293 |
| 6,591,694 | B2 | * | 7/2003 | Tsai et al. | ................. 73/861.57 |
| 7,219,559 | B2 | * | 5/2007 | Sugi et al. | ................. 73/861.56 |

FOREIGN PATENT DOCUMENTS

JP    2001-221666    8/2001

* cited by examiner

*Primary Examiner*—Jewel Thompson
(74) *Attorney, Agent, or Firm*—Lucas & Mercanti, LLP

(57) ABSTRACT

A flow meter using digital signals constructed in a small size and outputting an electric signal of a position of a float in a tapered tube with high accuracy is provided.

A first reflecting means 6 has a ray 20 entered from the entering means 5 and reflected, and a second reflecting means 7 reflecting the ray 20 reflected from the first reflecting means 6 toward the first reflecting means 6 at least once. An emitting means 8 has the ray 20 entered and emits it, and an image sensor 9 has the ray 20 from the emitting means 8 entered and outputs an image of the float 3 in the tapered tube 1, while a control portion executes input processing of an image and outputs an electric signal S1 indicating the flow rate of a fluid 2 by detecting the position of the float 3.

4 Claims, 9 Drawing Sheets

(b)

(a)

(b)   (a)
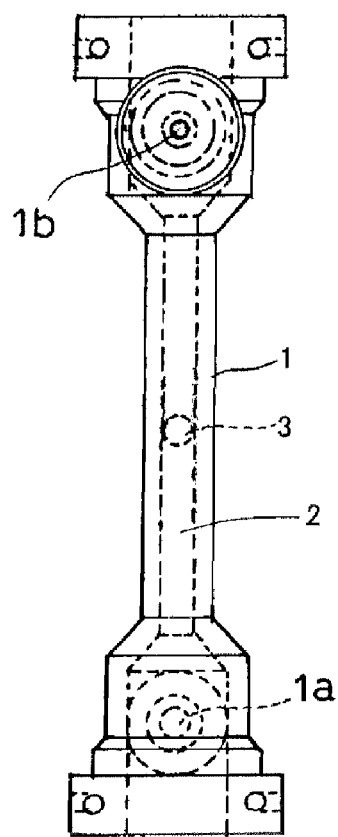
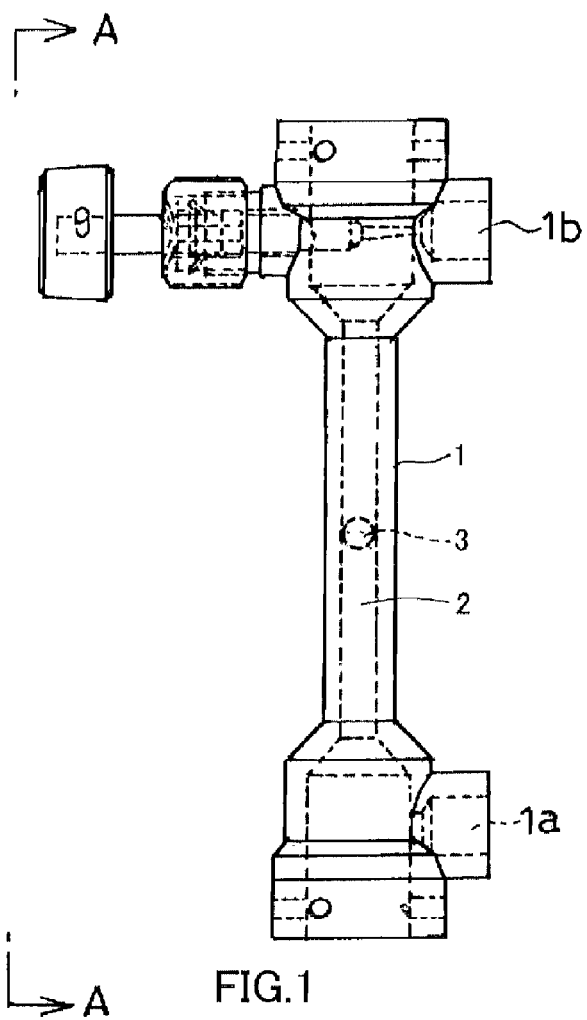
FIG.1

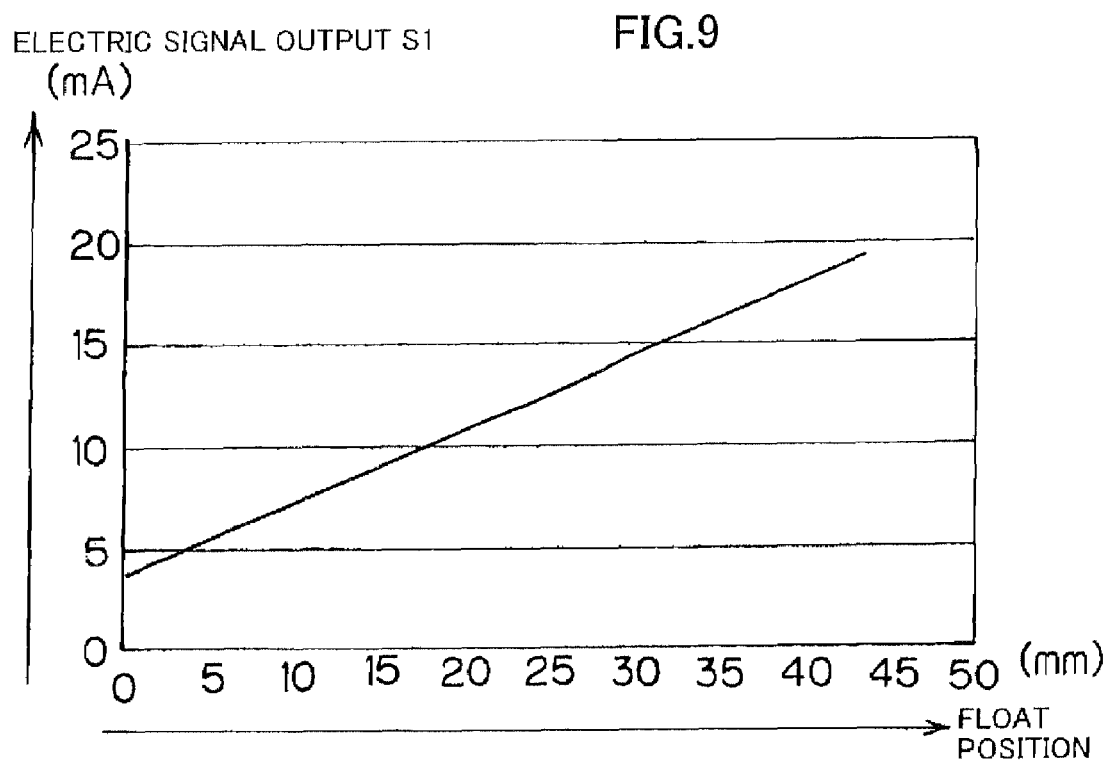

FLOW METER USING DIGITAL SIGNALS

BACKGROUND OF THE INVENTION

1. Technical Field

The present invention relates to a flow meter using digital signals which measures a flow rate of a fluid by detecting a position of a float in a tapered tube by an image sensor.

2. Background Art

The present applicant proposed an accurate, small-sized and inexpensive variable-area flow meter with sensor in Japanese Patent Laid-Open No. 2001-221666.

In this conventional variable-area flow meter with sensor, a float vertically moved by a flow rate is provided in a tapered tube having light transmittance, and a fluid to be measured flows in from an inflow port at a lower part toward an inflow port at an upper part, and a plurality of pairs of image sensor units comprised by an optical lens and an image sensor are arranged along the single side of the tapered tube in the vertical direction.

DISCLOSURE OF INVENTION

The present invention has an object to provide a flow meter using digital signals which is constructed in a small size while ensuring a light path length between the tapered tube as well as a float and an image sensor and outputs an electric signal at a position of a float in the tapered tube with high accuracy.

In order to achieve the above object, a flow meter using digital signals of the present invention comprising:

a tapered tube made of a substantially transparent or translucent material and mounted substantially perpendicularly and through which a fluid is made to flow;

a float arranged in the tapered tube so that it is displaced in the vertical direction corresponding to a flow rate of the fluid;

light emitting means for irradiating a ray to the tapered tube and the float to have it transmitted or reflected;

entering means to which the transmitted or reflected ray is entered and reflected;

first reflecting means in which the ray is entered from the entering means and reflected;

second reflecting means provided opposite to the first reflecting means and reflecting the ray reflected from the first reflecting means toward the first reflecting means at least once and having the ray reflected by the first reflecting means several times;

emitting means for having the ray reflected from the first reflecting means or the second reflecting means entered and emitting it;

an image sensor into which the ray is entered from the emitting means and outputting an image of the float in the tapered tube; and a control portion for input-processing the image, detecting the position of the float in the tapered tube and outputting an electric signal indicating the flow rate.

Moreover, the flow meter using digital signals of the present invention further comprising at least one or more mask means having a hole portion so as to narrow the ray to a light path only in a predetermined range and provided on the surface of the first reflecting means and/or the second reflecting means.

Furthermore, the flow meter using digital signals of the present invention further comprising at least one or more mask means constructed by a plurality of partition plates so as to narrow the ray to the light path only in a predetermined range and provided on the surface of the first reflecting means and/or the second reflecting means.

According to the flow meter using digital signals of the present invention, the ray irradiated to the tapered tube and the float is entered, after transmission or reflection to the entering means to which the transmitted or reflected ray is entered sequentially, the first reflecting means in which the ray is entered from the entering means and reflected, the second reflecting means provided opposite to the first reflecting means for reflecting the ray reflected from the first reflecting means toward the first reflecting means at least once and having the ray reflected by the first reflecting means several times, the emitting means for having the ray reflected by the first reflecting means or the second reflecting means entered and emitting it, and the image sensor to which the ray is entered from the emitting means and outputs an image of the float in the tapered tube.

Thus, a distance between the tapered tube as well as the float and the image sensor is made short, and though the necessary light path length of the transmitted or reflected ray is ensured, the distance between the tapered tube as well as the float and the image sensor is made short and as a result, the entire device is constructed compact.

Moreover, according to the flow meter using digital signals of the present invention, at least one or more mask means has a hole portion so as to narrow the ray to a light path only in a predetermined range and is provided on the surface of the first reflecting means and/or the second reflecting means.

Therefore, an unnecessary light path is shut off, only a necessary predetermined digital image is entered into the image sensor, detection processing of the float position is executed accurately and reliably at the control portion for carrying out input processing of the digital image, and an electric signal of the float position in the tapered tube can be surely outputted with accuracy.

Moreover, according to the flow meter using digital signals of the present invention, at least one or more mask means is constructed in the state of a plurality of partition plates so as to narrow the ray to the light path only in a predetermined range and provided on the surface of the first reflecting means and/or the second reflecting means.

Therefore, an unnecessary light path is shut off, only a necessary predetermined digital image is entered into the image sensor, detection processing of the float position is executed accurately and reliably at the control portion for carrying out input processing of the digital image, and an electric signal of the float position in the tapered tube can be surely outputted with accuracy.

BRIEF DESCRIPTION OF THE DRAWINGS

FIG. 1 is a partial block diagram of an embodiment 1 of the present invention;

FIG. 9 is an explanatory graph showing a relation between an electric signal outputted from the embodiment 1 of the present invention and a float.

BEST MODE FOR CARRYING OUT THE INVENTION

The present invention will be described below based on embodiments referring to the attached drawings.

Figure 2:
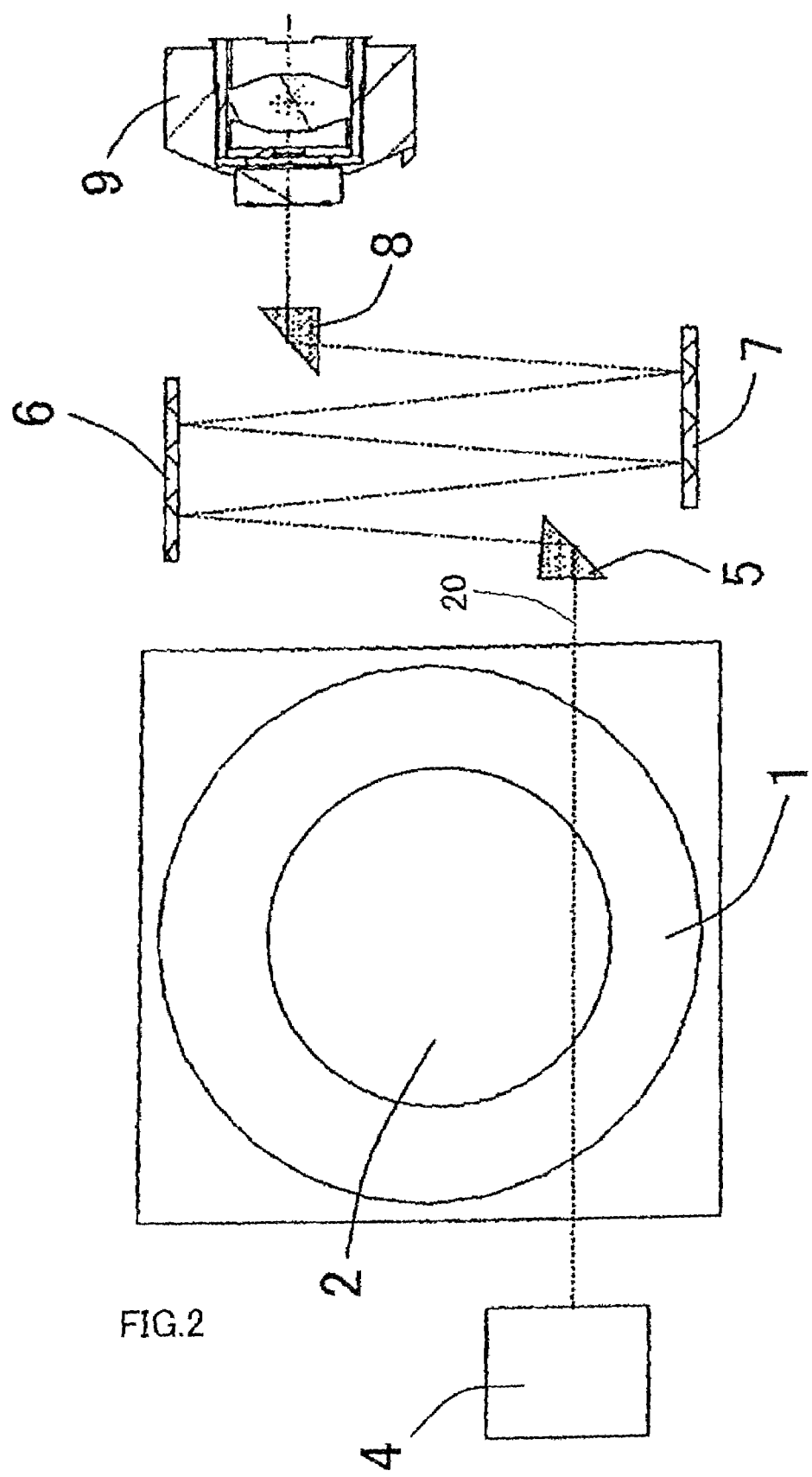
FIG. 2 is a plan view of the embodiment 1 of the present invention.

FIG. 1 is a partial block diagram including A-A arrow view of an embodiment 1 of the present invention, and FIG. 2 is a plan view of the embodiment 1 of the present invention.

A tapered tube 1 is made of a substantially transparent or translucent material, arranged substantially perpendicularly and through which a fluid 2 such as water is made to flow.

The fluid 2 to be measured flows in from an inflow port 1a at a lower part and flows out from an outflow port 1b at an upper part. A float 3 is arranged inside the tapered tube 1 so that it is displaced vertically in correspondence with the flow rate of the fluid 2.

Light emitting means 4 are made of an LED, liquid crystal or the like and arranged in plural along the tapered tube 1 so that a ray is irradiated to the tapered tube 1 and the float 3 and transmitted through the tapered tube 1 to have a transmitted ray 20.

Entering means 5 have the transmitted or reflected ray 20 entered/reflected and usually made of a prism but also may be made of a mirror.

First reflecting means 6 has the ray 20 entered from the entering means 5 and reflected and usually made of a mirror, but it may be made of a prism.

Second reflecting means 7 is provided opposite to the first reflecting means 6, reflects the ray 20 reflected from the first reflecting means 6 toward the first reflecting means 6 at least once, reflects the ray 20 by the first reflecting means 6 several times and is usually made of a mirror but it may be made of a prism.

Figure 3:
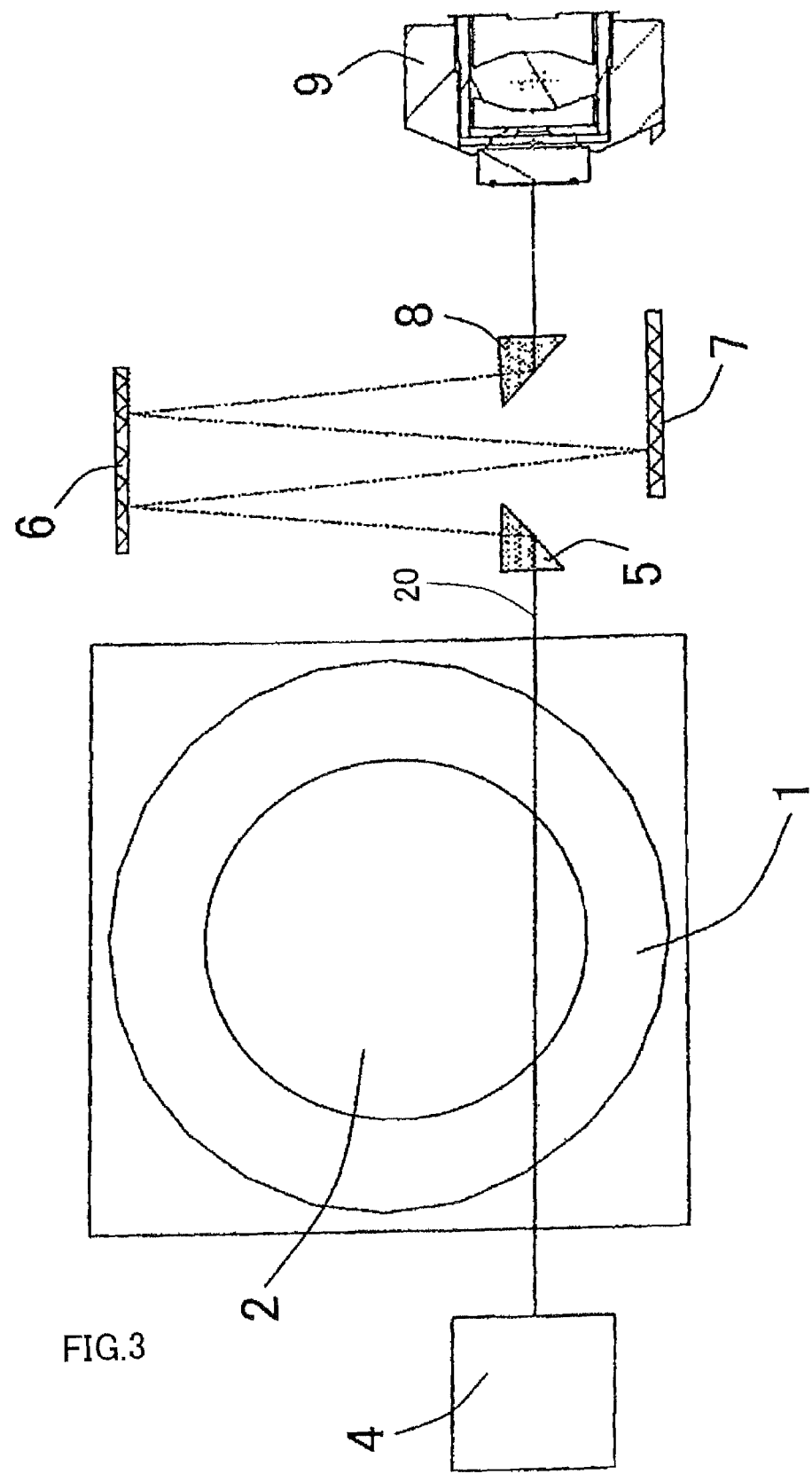
FIG. 3 is a plan view of an embodiment 2 of the present invention.

Emitting means 8 comprised by a mirror, a prism has the ray 20 reflected by the first reflecting means 6 as in the embodiment 2 of the present invention shown in FIG. 3 or the second reflecting means 7 as in the embodiment 1 of the present invention shown in FIG. 2 entered and emits it.

An image sensor 9 has the ray 20 from the emitting means 8 entered and outputs a digital image or an analog image of the float 3 in the tapered tube 1.

Next, embodiments 3, 4, 5 of the present invention will be described referring to FIGS. 4, 5, 6.

Figure 4:
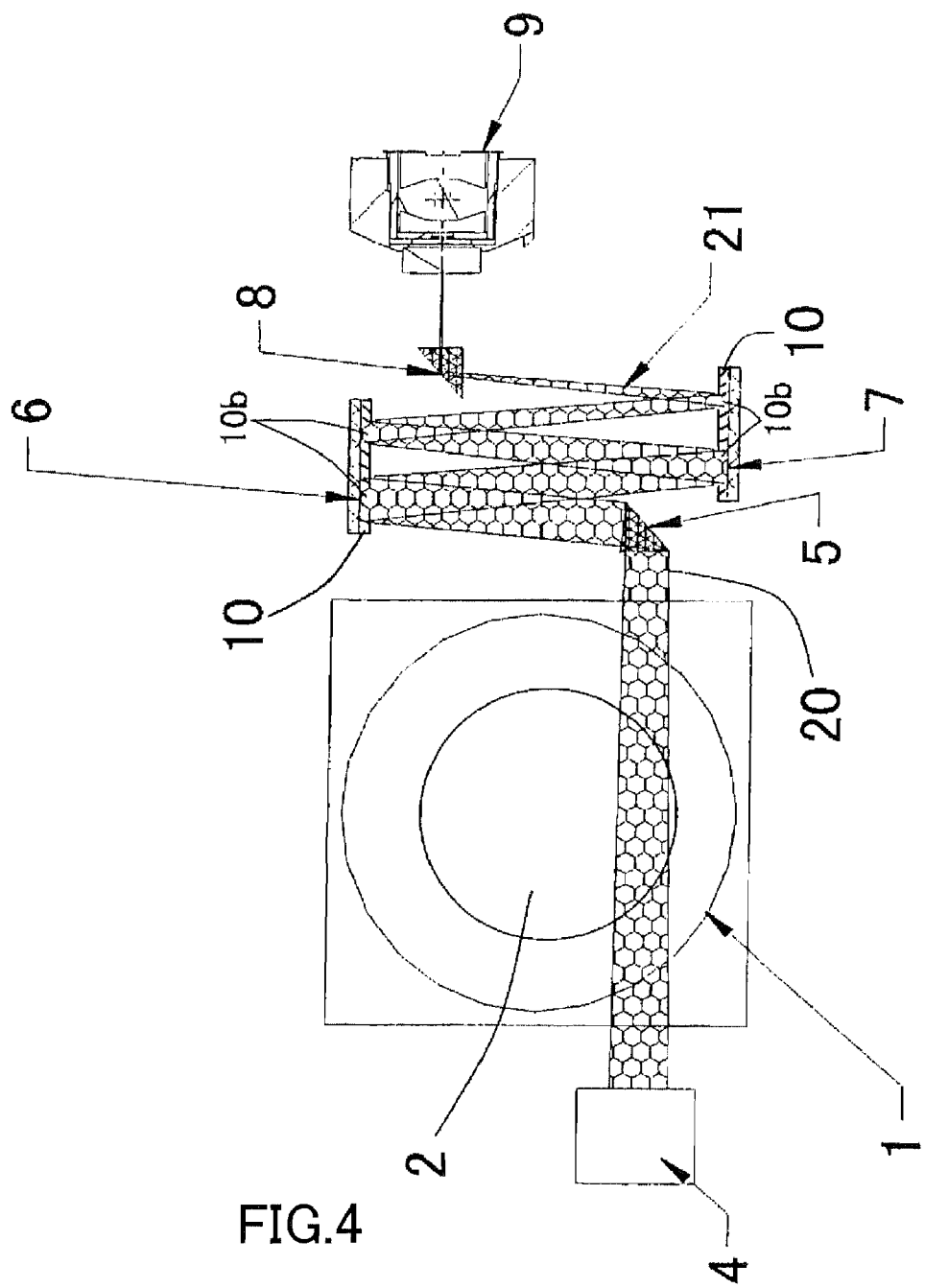
FIG. 4 is a plan view of an embodiment 3 of the present invention.
Figure 5:
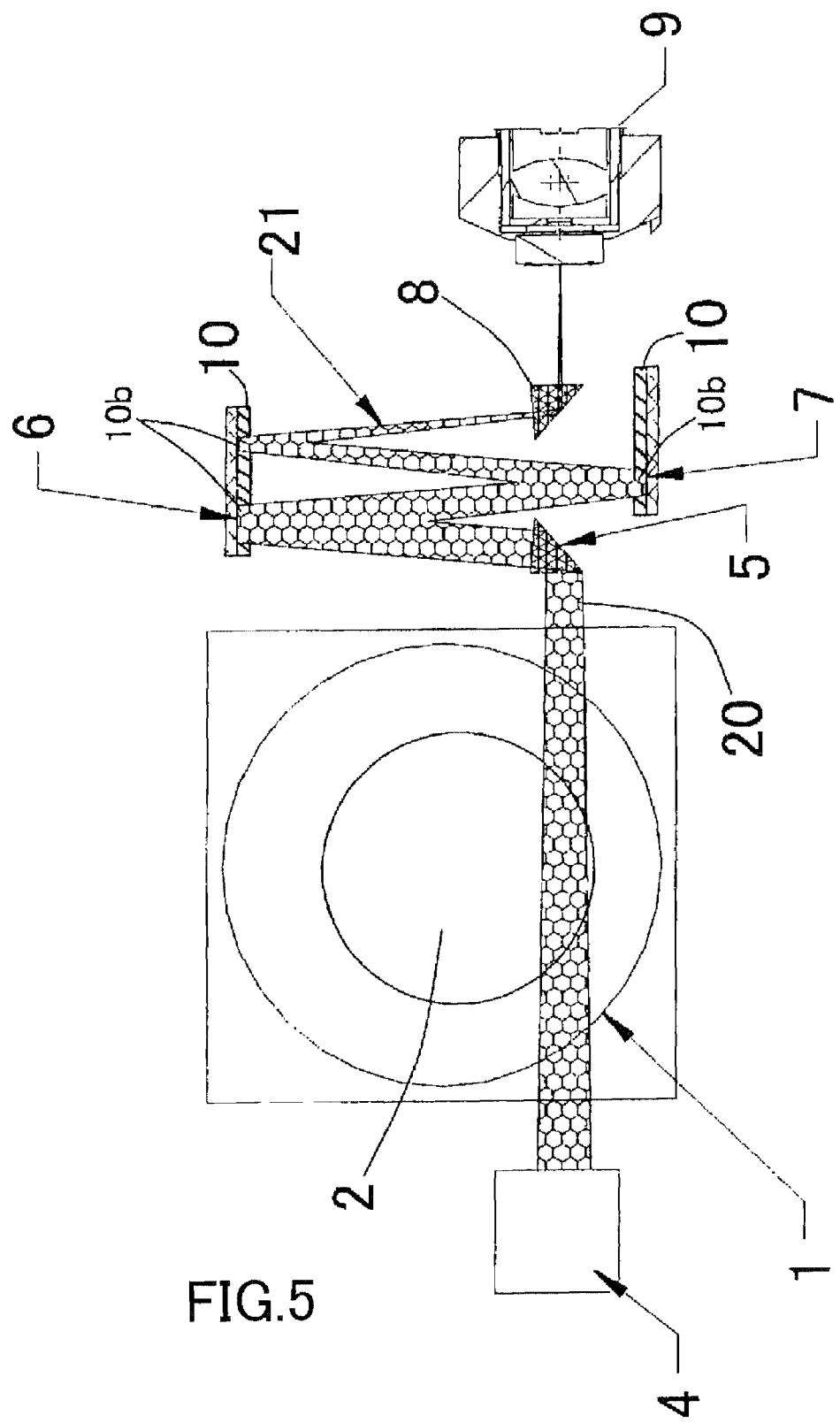
FIG. 5 is a plan view of an embodiment 4 of the present invention.
Figure 6:
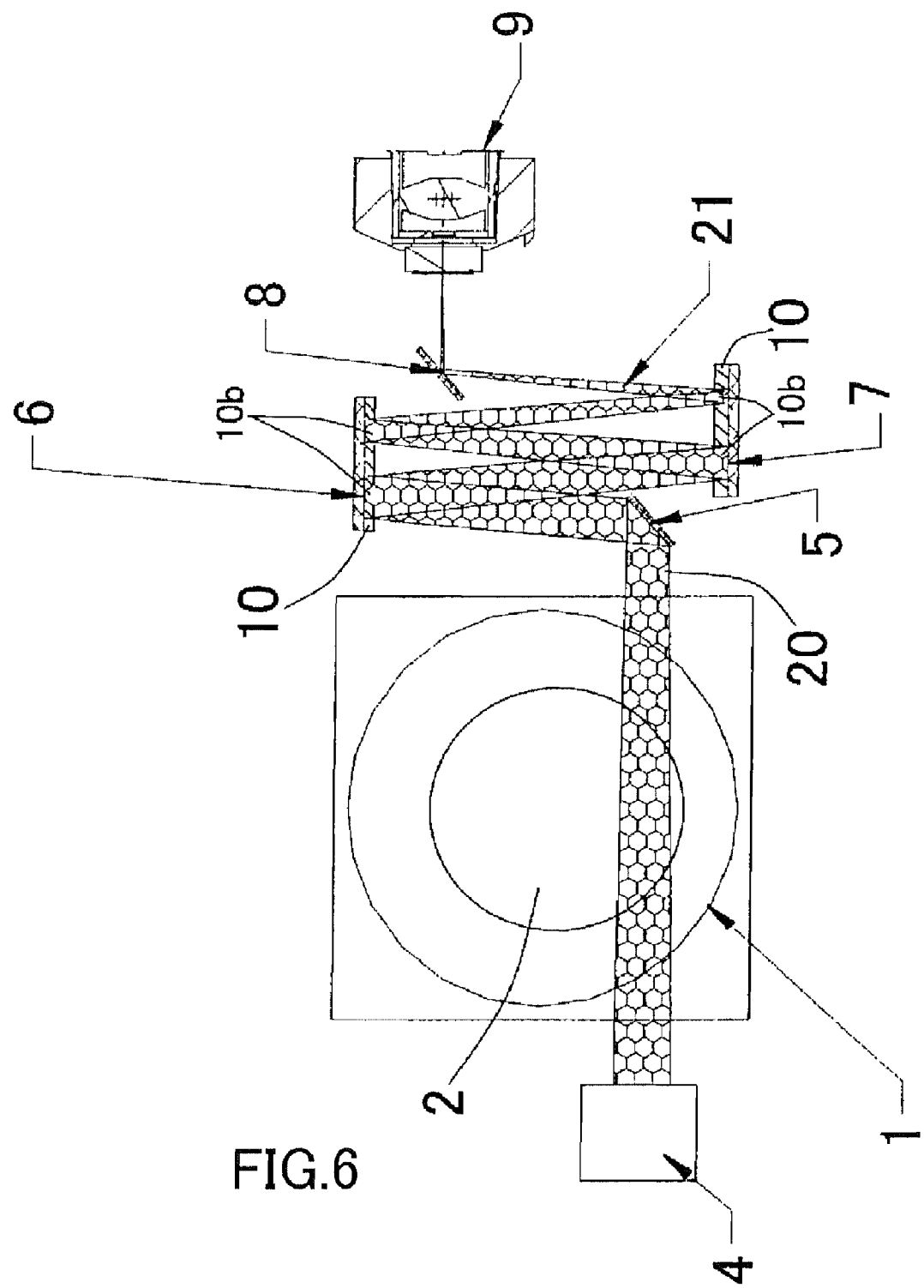
FIG. 6 is a plan view of an embodiment 5 of the present invention.

In the embodiments 3, 4, 5 of the present invention shown in FIGS. 4, 5, 6, a hole portion 10b is provided to narrow the ray 20 to a light path 21 of only a predetermined range, and at least one or more mask means 10 are provided on the surface of the first reflecting means 6 and/or the second reflecting means 7. The mask means 10 has the hole portion 10b so as to narrow the ray 20 to the light path 21 only of the predetermined range and is made of polycarbonate, ABS resin and the like.

Therefore, an unnecessary light path is shut off, only a required and predetermined digital image is entered into the image sensor, detection processing of the position of the float 3 is executed accurately and surely at the control portion, not shown, for carrying out input processing of digital images, and an electric signal S1 of the position of the float 3 in the tapered tube 1 can be outputted with accuracy and reliably.

Next, an embodiment 6 of the present invention will be described referring to FIG. 7.

Figure 7:
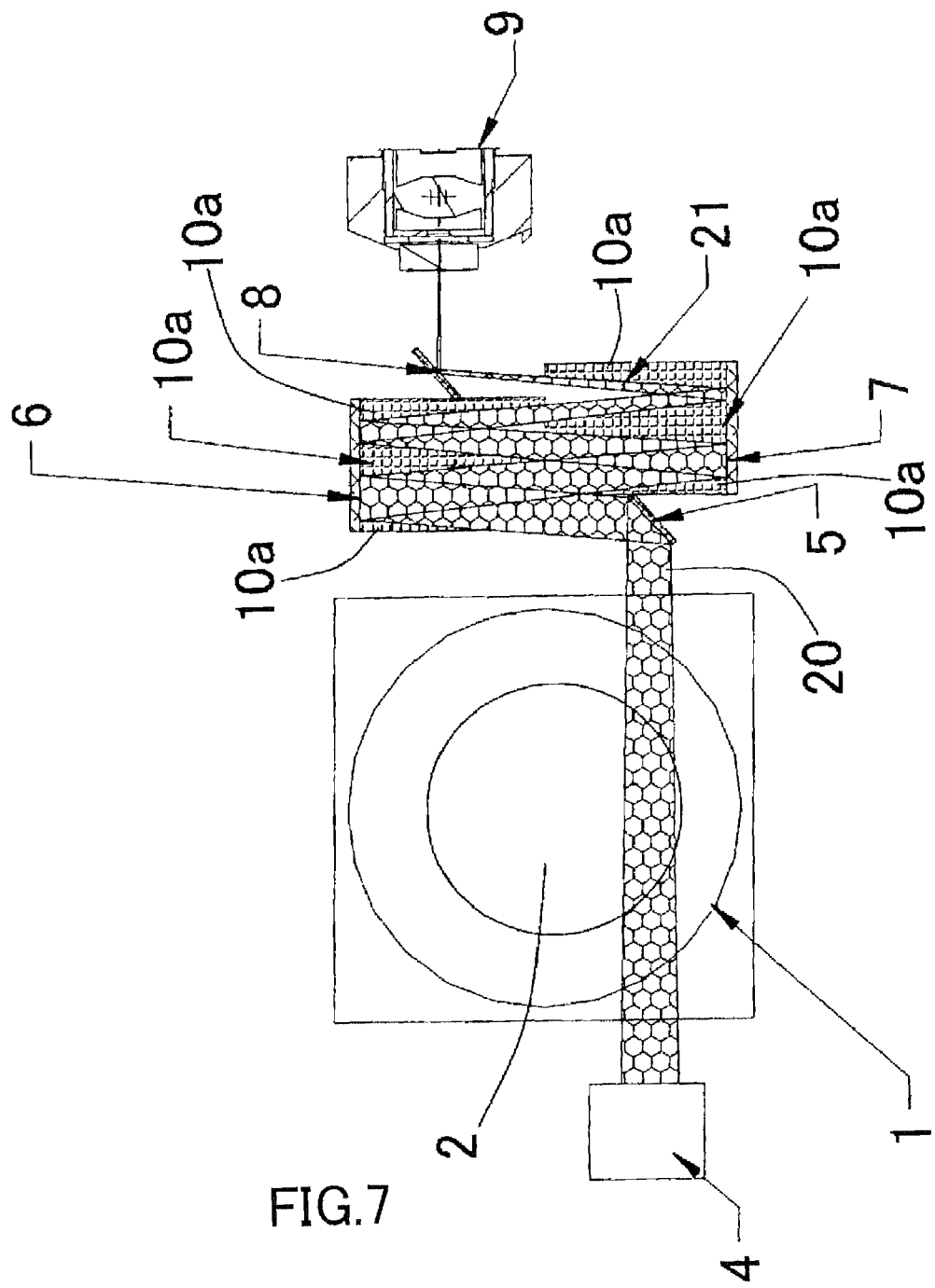
FIG. 7 is a plan view of an embodiment 6 of the present invention.

In the embodiment 6 of the present invention shown in FIG. 7, at least one or more mask means 10a are provided on the surface of the first reflecting means 6 and/or the second reflecting means 7 to narrow the ray 20 to the light path 21 only of the predetermined range. The mask means 10a is constructed by a plurality of partition plates so as to narrow the ray 20 to the light path 21 only of the predetermined range and is made of polycarbonate, ABS resin and the like.

Therefore, an unnecessary light path is shut off, only a required and predetermined digital image is entered into the image sensor, detection processing of the position of the float 3 is executed accurately and surely at the control portion, not shown, for carrying out input processing of digital images, and an electric signal S1 of the position of the float 3 in the tapered tube 1 can be outputted with accuracy and reliably.

Figure 8:
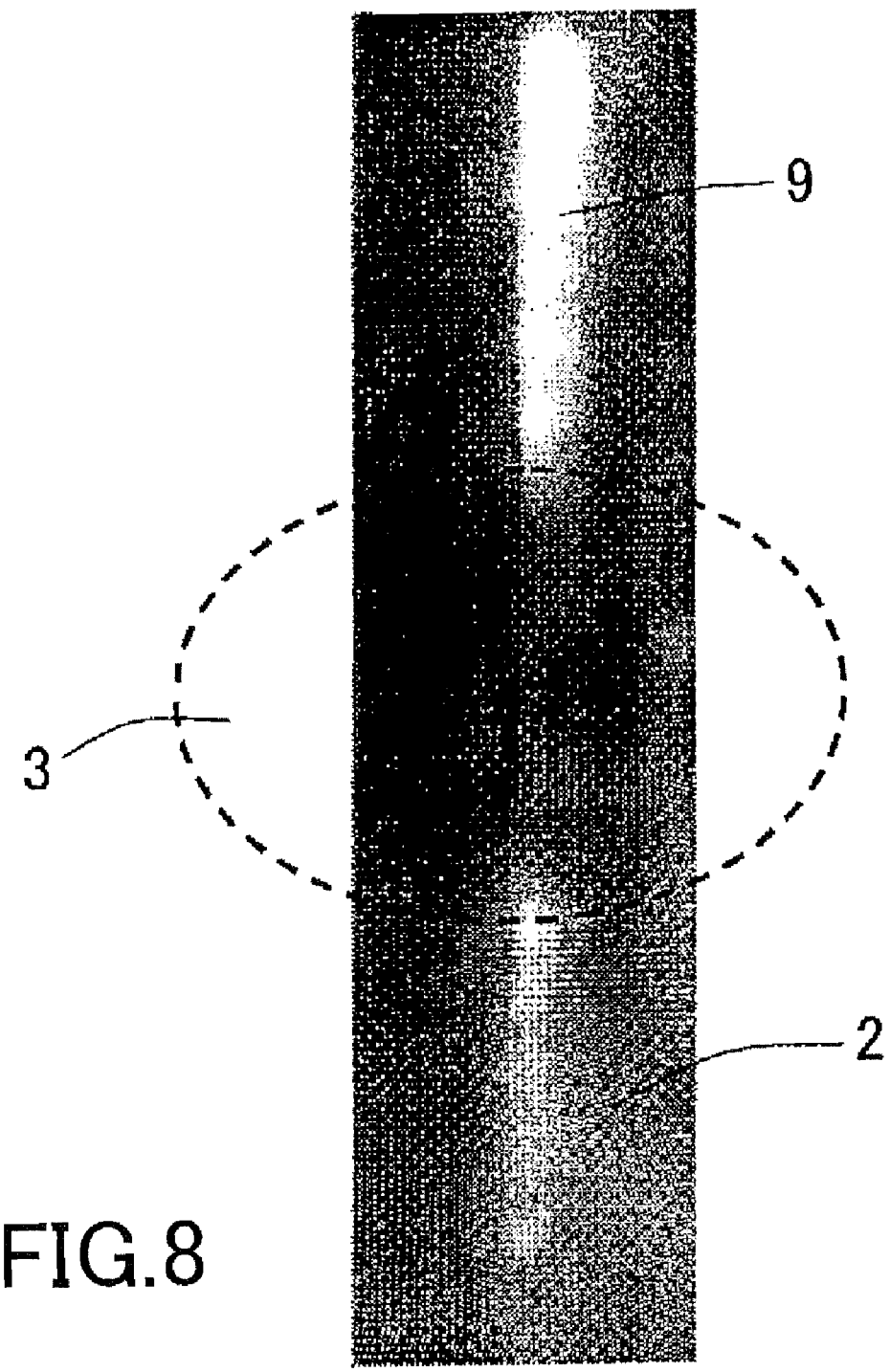
FIG. 8 is an image diagram of a ray transmitted or reflected in the embodiment 1 of the present invention and photographed by an image sensor.

In the embodiment 1 of the present invention shown in FIGS. 1, 2, the image sensor 9 of the CCD type, CMOS type, POC type or the like has the transmitted ray 20 entered from the emitting means 8 made of a mirror, prism and outputs an image shown in FIG. 8 of the float 3 in the tapered tube 1.

The control portion, not shown, executes input processing of the image shown in FIG. 8 and outputs the electric signal S1 shown in FIG. 9 indicating the flow rate of the fluid 2 by detecting the position of the float 3 in the tapered tube 1. This electric signal S1 indicates a flow rate of the fluid 2 by an indicator or the like, not shown.

Since the image sensor 9, not a light receiving device array, is used, resolution is high and the electric signal S1 of the position of the float 3 in the tapered tube 1 can be outputted with high accuracy.

What is claimed is:

1. A flow meter using digital signals comprising:
   a tapered tube made of a substantially transparent or translucent material and mounted substantially perpendicularly and through which a fluid is made to flow;
   a float arranged in the tapered tube so that it is displaced in the vertical direction corresponding to a flow rate of the fluid;
   light emitting means for irradiating a ray to the tapered tube and the float to have it transmitted or reflected;
   entering means to which the transmitted or reflected ray is entered and reflected;
   first reflecting means in which the ray is entered from the entering means and reflected;
   second reflecting means provided opposite to the first reflecting means and reflecting the ray reflected from the first reflecting means toward the first reflecting means at least once and having the ray reflected by the first reflecting means several times;
   emitting means for having the ray reflected from the first reflecting means or the second reflecting means entered and emitting it;
   an image sensor into which the ray is entered from the emitting means and outputting an image of the float in the tapered tube; and
   a control portion for input-processing the image, detecting the position of the float in the tapered tube and outputting an electric signal indicating the flow rate;
   said flow meter further comprises at least one or more mask means having a hole portion being provided on the surface of the first reflecting means and/or the second reflecting means so as to narrow the ray to a light path only in a predetermined range.

2. The flow meter using digital signals according to claim 1, wherein the light emitting means comprises a plurality of LED arranged along the tapered tube or light emitting bodies emitting and irradiating the ray evenly along the tapered tube.

3. A flow meter using digital signals comprising a tapered tube made of a substantially transparent or translucent material and mounted substantially perpendicularly and through which a fluid is made to flow;

a float arranged in the tapered tube so that it is displaced in the vertical direction corresponding to a flow rate of the fluid;

light emitting means for irradiating a ray to the tapered tube and the float to have it transmitted or reflected;

entering means to which the transmitted or reflected ray is entered and reflected;

first reflecting means in which the ray is entered from the entering means and reflected;

second reflecting means provided opposite to the first reflecting means and reflecting the ray reflected from the first reflecting means toward the first reflecting means at least once and having the ray reflected by the first reflecting means several times;

emitting means for having the ray reflected from the first reflecting means or the second reflecting means entered and emitting it;

an image sensor into which the ray is entered from the emitting means and outputting an image of the float in the tapered tube; and a control portion for input-processing the image, detecting the position of the float in the tapered tube and outputting an electric signal indicating the flow rate;

said flow meter further comprises at least one or more mask means constructed by a plurality of partition plates provided on the surface of the first reflecting means and/or the second reflecting means so as to narrow the ray to the light path only in a predetermined range.

4. The flow meter using digital signals according to claim 3, wherein the light emitting means comprises a plurality of LED arranged along the tapered tube or light emitting bodies emitting and irradiating the ray evenly along the tapered tube.

* * * * *